3,119,825
METHYLOL LEUCINE DIKETOPIPERAZINES
Marvin T. Tetenbaum and Earl Eugene Fisher, Decatur, Ill., assignors to A. E. Staley Manufacturing Company, Decatur, Ill., a corporation of Delaware
No Drawing. Filed Mar. 8, 1961, Ser. No. 94,146
9 Claims. (Cl. 260—268)

This invention relates to methylol leucine diketopiperazines and esters thereof.

United States Patent 2,586,168 to Kaszuba suggests the use of 1,4-dimethylol diketopiperazines, including 1,4-dimethylol-3,6-diisobutyl-2,5-diketopiperazine (dimethylol leucine diketopiperazine), as hardening agents for silver halide gelatin emulsions and states that various dimethylol diketopiperazines can be prepared by the method disclosed by Helv. Chim. Acta 5, page 683 (1922). While Helv. Chim. Acta discloses the formation of 1,4-dimethylol-2,5-diketopiperazine by reacting formaldehyde with an aqueous solution of 2,5-diketopiperazine (glycine anhydride), it does not disclose or even make reference to the preparation of monomethylol or dimethylol leucine diketopiperazines. We have found that leucine diketopiperazine does not react with formaldehyde under the conditions disclosed in this reference.

We have now found that leucine diketopiperazine reacts with formaldehyde to form 1-methylol-3,6-diisobutyl-2,5-diketopiperazine, 1,5-dimethylol-3,6-diisobutyl-2,5-diketopiperazine and 5-methylol-3,6-diisobutyl-2,5-diketopiperazine in an alkaline solvent medium for leucine diketopiperazine and formaldehyde. It should be noted that the 1-methylol compound, which has its methylol group on a nitrogen of the diketopiperazine ring, and the 5-methylol compound, which has its methylol group on an enolized keto group, are isomers. In a neutral solvent medium only 5-methylol-3,6-diisobutyl-2,5-diketopiperazine forms. The 1,4-dimethylol-3,6-diisobutyl-2,5-diketopiperazine was not obtained under neutral or alkaline conditions.

One object of this invention is to react leucine diketopiperazine with formaldehyde.

A second object of this invention is to prepare 1-methylol-3,6-diisobutyl-2,5-diketopiperazine.

A third object of this invention is to prepare 1,5-dimethylol-3,6-diisobutyl-2,5-diketopiperazine.

Another object of this invention is to prepare 5-methylol-3,6-diisobutyl-2,5-diketopiperazine.

Still another object of this invention is to prepare esters of monomethylol-3,6-diisobutyl-2,5-diketopiperazines.

In one aspect this invention is a method in which formaldehyde is reacted with leucine diketopiperazine in a mutual solvent.

In a second aspect this invention is a method of preparing at least one compound selected from the group consisting of 1-methylol-3,6-diisobutyl-2,5-diketopiperazine, 1,5-dimethylol-3,6-diisobutyl-2,5-diketopiperazine and 5-methylol-3,6-diisobutyl-2,5-diketopiperazine, which comprises reacting leucine diketopiperazine with formaldehyde in an alkaline solvent medium.

In a third aspect of this invention is a method of preparing 5-methylol-3,6-diisobutyl-2,5-diketopiperazine, which comprises reacting leucine diketopiperazine with formaldehyde in a neutral solvent.

In a fourth aspect of this invention is a method of preparing 1-methylol-3,6-diisobutyl-2,5-diketopiperazine which comprises reacting formaldehyde with leucine diketopiperazine in an alkaline aqueous medium and isolating the insoluble 1-methylol-3,6-diisobutyl-2,5-diketopiperazine as it precipitates from the reaction mixture.

In another aspect this invention is a method of preparing 1,5-dimethylol-3,6-diisobutyl-2,5-diketopiperazine, which comprises dispersing precipitated 1-methylol-3,6-diisobutyl-2,5-diketopiperazine in an alkaline formaldehyde solution and then extracting 1,5-dimethylol-3,6-diisobutyl-2,5-diketopiperazine as a syrup, as it forms.

In brief the various methylol leucine diketopiperazines and mixtures thereof can be prepared by varying the method of isolation from the leucine diketopiperazine-formaldehyde reaction mixture and/or the solvent used. More specifically, a syrupy 5-methylol-3,6-diisobutyl-2,5-diketopiperazine can be prepared by extraction of a neutral solution of formaldehyde and leucine diketopiperazine; on the other hand, the crystalline 5-methylol-3,6-diisobutyl-2,5-diketopiperazine (M.P. 130–135° C.) can be prepared by isolating the crystalline material that forms on an extracted alkaline reaction product. The syrupy 1,5-dimethylol-3,6-diisobutyl-2,5-diketopiperazine can be prepared by removing crystalline material from the syrup that forms in the alkaline reaction of formaldehyde and leucine diketopiperazine; alternatively, the 1,5-methylol compound can be prepared by solvent extraction of the reaction product of 1-methylol-3,6-diisobutyl-2,5-diketopiperazine and formaldehyde 1-methylol-3,6-diisobutyl-2,5-diketopiperazine (M.P. 273–275° C.) precipitates from the aqueous alkaline reaction of formaldehyde and leucine diketopiperazine.

In somewhat greater detail the process employed in this invention comprises reacting leucine diketopiperazine with formaldehyde in a mutual solvent at a temperature of from 0° C. to 100° C. or higher (preferably at from 75° C. up to and including the reflux temperature of the system). Apparently 5-methylol-3,6-diisobutyl-2,5-diketopiperazine is the first compound to form when an alkaline medium is employed and the only isomer to form in a neutral medium. Essentially pure 5-methylol-3,6-diisobutyl-2,5-diketopiperazine can be extracted from the neutral medium in a solvent, such as chloroform or ethyl ether. The syrupy, yellow 5-methylol-3,6-diisobutyl-2,5-diketopiperazine which results from the evaporation of the extraction solvent, reverts to leucine diketopiperazine and formaldehyde on heating or on dissolution in aqueous ethanol.

Isolation of 5-methylol-3,6-diisobutyl-2,5-diketopiperazine from alkaline reaction medium is more difficult, since 1,5-dimethylol-3,6-diisobutyl-2,5-diketopiperazine forms at only a slightly slower rate than the 5-methylol-3,6-diisobutyl-2,5-diketopiperazine. Accordingly, a yellow, syrupy mixture of these two compounds results from solvent extraction and subsequent solvent evaporation. On standing for about 48–72 hours a yellow crystalline material is deposited by syrupy extract. The crystalline material can be separated from the extract by dissolving the extract in a solvent, such as ethyl ether, and then filtering off the insoluble, crystalline material which is 5-methylol-3,6-diisobutyl-2,5-diketopiperazine. The crystalline material melts at 130–135° C. regenerating formaldehyde and leucine diketopiperazine. The crystalline 5-methylol-3,6-diisobutyl-2,5-diketopiperazine prepared in this way and the syrupy 5-methylol compound prepared in a neutral solvent have essentially the same infrared spectrum. To isolate essentially pure 1,5-dimethylol - 3,6 - diisobutyl-2,5-diketopiperazine, the syrupy filtrate from the alkaline reaction mixture is concentrated and any further crystalline material is removed as it forms.

1 - methylol-3,6-diisobutyl-2,5-diketopiperazine, which melts at 273°–275° C., is the third methylol compound to form in the alkaline reaction mixture. This compound which is in equilibrium with 1,5-dimethylol-3,6-diisobutyl-2,5-diketopiperazine, starts to precipitate from the aqueous alkaline reaction medium in about 2 to 7 days. When an alkaline medium, in which the 1-methylol-3,6-diisobutyl-2,5-diketopiperazine is soluble, is employed, the equilibrium favors the production of 1,5-dimethylol-3,6-diisobutyl-2,5-diketopiperazine. However, some 1 - methylol-3,6-diisobutyl-2,5-dikeptopiperazine is present in equilibrium with the mixture of 5-methylol-3,6-diisobutyl-2,5-diketopiperazine and 1,5-dimethylol-3,6-diisobutyl-2,5-diketopiperazine. Just how strongly the equilibrium favors 1,5-dimethylol-3,6-diisobutyl-2,5-diketopiperazine is apparent from the fact that essentially pure 1,5-dimethylol-3,6-diisobutyl-2,5-diketopiperazine syrup can be prepared by dispersing the precipitated 1-methylol-3,6-diisobutyl-2,5-diketopiperazine in fresh aqueous alkali with formaldehyde, extracting the 1,5-methylol compound with chloroform and evaporating off the solvent to leave the syrupy 1,5-dimethylol compound. On dissolution of this material in ethanol followed by the addition of water, 1-methylol-3,6-diisobutyl-2,5-diketopiperazine reprecipitates.

In summation, we believe that the methylol leucine diketopiperazines of this invention form in the following manner:

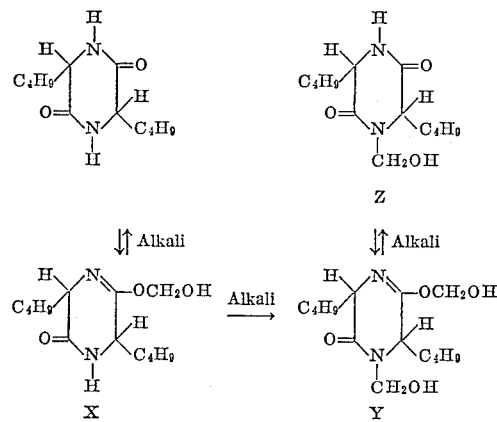

X is 5-methylol-3,6-diisobutyl-2,5-diketopiperazine.
Y is 1,5-dimethylol-3,6-diisobutyl-2,5-diketopiperazine.
Z is 1-methylol-3,6-diisobutyl-2,5-diketopiperazine.

While any alkaline material may be used at a pH of from 7–13 to catalyze the reaction of leucine diketopiperazine and formaldehyde, alkali metal salts of weak acids are preferred. When a strong base, such as sodium hydroxide or potassium hydroxide, is used in this reaction, the formaldehyde undergoes the Cannizzaro reaction, which reduces the pH of the reaction medium and produces undesirable by-products in addition. Although leucine diketopiperazine continues to react with formaldehyde after the pH of the reaction mixture drops below 7, the reaction is greatly retarded. Alkali metal salts of weak acids, such as sodium carbonate, sodium formate, sodium borate or tetraborate and potassium acetate, have little tendency to promote the Cannizzaro reaction and, accordingly, the pH of the reaction mixture can be buffered between about 7 and 8.

While any alkaline medium, which is a solvent for leucine diketopiperazine and formaldehyde can be used to prepare the methylol leucine diketopiperazines and mixtures thereof, water and methanol are the preferred media for the reactants, particularly since formaldehyde is normally available in an aqueous or methanol solution. Further, water is inexpensive and aids in the isolation of 1-methylol-3,6-diisobutyl-2,5-diketopiperazine. Methanol, on the other hand, has a catalytic effect on the formation of the various methylol leucine diketopiperazine derivatives, when it is used as the sole solvent or in small quantities with another solvent. When an aqueous alkaline reaction medium is employed, inhibited formaldehyde (containing some methanol) forms the methylol derivatives more rapidly than uninhibited formaldehyde (methanol free). Further, pure 5-methylol-3,6-diisobutyl-2,5-diketopiperazine forms in a neutral methanol solution.

Although formaldehyde can be present in the solvent medium in virtually any concentration, it is usually used in a concentration of 25% to 40% by weight of the reaction medium, since this is approximately the concentration of formaldehyde in commercially available formalin and Methyl Formacel. Generally from about 1 to 20 grams and preferably from 3 to 8 grams of formaldehyde can be used per gram of leucine diketopiperazine. When less than one gram of formaldehyde is present per gram of leucine diketopiperazine, the reaction is too slow to be of any practical value.

Each of the methylol leucine diketopiperazines and mixtures thereof can be used as formaldehyde generators for hardening silver halide gelatin emulsions, as wet-end additives in paper making, etc. The crystalline 5-methylol-3,6-diisobutyl-2,5-diketopiperazine and the crystalline 1-methylol-3,6-diisobutyl-2,5-diketopiperazine react readily with acyl halides or anhydrides in an alkaline medium to form esters, which can be used as peroxide bleach assistants, resin stabilizers, etc. While it is not clear, we believe that the 5-methylol compound isomerizes during esterification, and a 1-methylol ester is formed. We also believe that, during esterification of the syrupy 1,5-dimethylol-3,6-diisobutyl-2,5-diketopiperazine, the 1-methylol ester forms with concurrent loss of the 5-methylol group.

The following examples are merely illustrative of the invention and should not be construed as limiting the scope of the invention.

*Example 1*

Twenty-five grams of leucine diketopiperazine were dissolved in 300 ml. of methanol-inhibited formalin, which had been adjusted to pH8 with sodium carbonate. After the mixture had been heated at 75° C. for 5 days, a solid began to precipitate. The solid was removed by filtration as it formed. After a total of 16 days, 17 grams of solid was obtained. This represented a yield of 72% of the compound 1-methylol-3,6-diisobutyl-2,5-diketopiperazine, which had a melting point of 273° C. after one recrystallization from ethanol. Infrared showed the presence of about an equal number of OH and NH groups and an absence of ether linkages.

In order to confirm the above structure 5 grams of 1-methylol-3,6-diisobutyl-2,5-diketopiperazine and 15 ml. acetic anhydride were refluxed in 100 ml. pyridine for 2¼ hours. After the mixture was poured onto ice, 4 grams of solid having a melting point of 206–208° C. was obtained. After two ethanol recrystallizations, it melted at 214–215° C. The product analyzed: C, 60.33%; H, 8.70%; N, 9.26%; as compared to the calculated: C, 60.4%; H, 8.72%; N, 9.38%. Infrared showed the presence of NH groups and an absence of OH groups in the acetate.

*Example 2*

Fifty grams of leucine diketopiperazine were dissolved in 600 ml. inhibited formalin, which had been adjusted to pH 8 with KOH. After stirring for three hours at 25° C., the mixture was filtered. The filtrate was treated with 300 ml. chloroform and then separated in a separatory funnel. The chloroform layer was washed with a NaHSO₃ solution in order to remove excess formaldehyde and then dried over "drierite." Evaporation of solvent left 45 grams of a thick yellow syrup upon which a crystalline crust formed in about three days. The syrup and crust were washed in anhydrous ethyl ether and then filtered. The crystalline material was insoluble in the ethyl ether, while the syrup came down in the filtrate. The ethyl ether was removed from the filtrate by evaporation.

The crystalline material melted at 130–135° C. with the loss of formaldehyde and the regeneration of leucine diketopiperazine. A Kjeldahl nitrogen analysis showed that the syrup had 9.68% nitrogen and that the crystalline material had 10.93%. The syrup appeared to be a dimethylol compound (9.78% nitrogen by theory) and the crystalline material appeared to be a monomethylol compound (11.0% nitrogen by theory). This was confirmed by the weight loss of each of these materials on heat regeneration of leucine diketopiperazine. Infrared showed that the syrup had ether linkages, hydroxyl groups and essentially no NH groups; and that the crystalline material had ether linkages, hydroxyl groups and NH groups. The above data indicated that the crystalline material was 5-methylol-3,6-diisobutyl-2,5-diketopiperazine and that the syrup was 1,5-dimethylol-3,6-diisobutyl-2,5-diketopiperazine.

Again the structure of the crystalline material was confirmed by refluxing 2.76 grams of the crystalline material and 2.76 grams of 3,5-dinitrobenzoyl chloride for two hours in pyridine. The ester was filtered, washed with water and then dried. After two ethanol recrystallizations the material melted at 204–206° C. The ester had 12.31% nitrogen (12.44% nitrogen by theory). Infrared showed the presence of NH groups, ester groups and nitro groups; and the absence of OH groups and ether groups. This appeared to indicate that the methylol group had shifted during the esterification to the one position.

*Example 3*

This example further illustrates the preparation of 1-methylol-3,6-diisobutyl-2,5-diketopiperazine. Five grams of leucine diketopiperazine were dissolved in 60 mls. of formalin, which had been adjusted to pH 8 with a sodium carbonate solution. After refluxing for two days, a precipitate formed, which was filtered, washed with water and then dried. The 3.05 grams, which were isolated, represented a 54% yield. The material melted at 273–275° C. and infrared confirmed the structure.

*Example 4*

This example illustrates the preparation of 5-methylol-3,6-diisobutyl-2,5-diketopiperazine. Five grams of leucine diketopiperazine were dissolved in 60 ml. Methyl Formacel (formaldehyde dissolved in methanol). After the mixture had been refluxed for 8 hours, a 20 ml. sample was taken. This sample was extracted with a chloroform and water mixture. After the chloroform layer was washed with water and dried over "drierite," the chloroform was evaporated leaving a yellow syrup. Elemental analysis and infrared confirmed the structure of the yellow syrupy compound as being 5-methylol-3,6-diisobutyl-2,5-diketopiperazine.

The remaining leucine diketopiperazine-formacel composition was refluxed for another five days before a yellow syrup was extracted. This material was also 5-methylol-3,6-diisobutyl - 2,5 - diketopiperazine. This example shows that in the absence of alkali, 5-methylol-3,6-diisobutyl-2,5-diketopiperazine is the sole reaction product of formaldehyde and leucine diketopiperazine.

*Example 5*

Example 4 was repeated except that the Methyl Formacel was adjusted to pH 8 with a sodium carbonate solution. The first sample, which was removed after eight hours, was a syrupy mixture of 1,5-dimethylol-3,6-diisobutyl-2,5-diketopiperazine and 5-methylol-3,6-diisobutyl-2,5-diketopiperazine.

After the remaining composition had been refluxed for five more days, 100 mls. of aqueous sodium carbonate (pH 8) was added to the reaction mixture, and this resulted in the formation of a precipitate. After the precipitate was filtered off, a syrupy mixture of 1,5-dimethylol-3,6-diisobutyl-2,5-diketopiperazine and 5-methylol-3,6-diisobutyl-2,5-diketopiperazine was extracted from the filtrate. The precipitate was recrystallized from ethanol twice; it melted at 273–275° C., indicating that, it was 1-methylol-3,6-diisobutyl-2,5-diketopiperazine.

*Example 6*

Example 1 was repeated except that 10 times as much leucine diketopiperazine and formalin were used and the reaction was carried out at reflux. After 17 days, 259 grams of 1-methylol-3,6-diisobutyl-2,5-diketopiperazine (M.P. 273–275° C.) were isolated representing a 92% yield.

*Example 7*

One and one-half grams of 1-methylol-3,6-diisobutyl-2,5-diketopiperazine were dispersed in 50 mls. of formalin and the dispersion was adjusted to pH 8 with a sodium carbonate solution. The methylol compound was immediately extracted in 50 mls. of chloroform and dried to a yellow syrup over "drierite." Infrared and elemental analysis indicated that the syrup was 1,5-dimethylol-3,6-diisobutyl-2,5-diketopiperazine. The syrup was dissolved in 50 mls. of ethanol. On the addition of water 1-methylol-3,6-dimethylol-2,5-diketopiperazine was regenerated.

*Example 8*

This example illustrates the use of an organic alkaline catalyst. One gram of leucine diketopiperazine was dissolved in 12 mls. of formalin, which had been adjusted to a pH of 10 with tetramethyl guanidine. After heating at 75° C. for five days, 1-methylol-3,6-diisobutyl-2,5-diketopiperazine precipitated.

*Example 9*

Two grams of 1-methylol-3,5-diisobutyl-2,5-diketopiperazine and two grams of tosyl chloride were refluxed in 25 mls. pyridine for one hour. The reaction mixture was poured onto ice, acidified with HCl and filtered; the precipitate was washed. After two ethanol recrystallizations, the white material melted at 235–236° C. Elemental analysis confirmed the formation of the tosyl ester of 1-methylol-3,6-diisobutyl-2,5-diketopiperazine.

Since many embodiments of this invention may be made and since many changes may be made in the embodiments described, the foregoing is to be interpreted as illustrative only, and our invention is defined by the claims appended hereafter.

We claim:
1. The process comprising reacting leucine diketopiperazine with formaldehyde in a mutual solvent.
2. The process of preparing at least one compound selected from the group consisting of 1-methylol-3,6-diisobutyl-2,5-diketopiperazine, 1,5-dimethylol-3,6-diisobutyl-2,5-diketopiperazine and 5-methylol-3,6-diisobutyl-2,5-diketopiperazine, which comprises reacting leucine diketopiperazine and formaldehyde in an alkaline solvent medium.
3. The process of preparing 5-methylol-3,6-diisobutyl-2,5-diketopiperazine, which comprises reacting leucine diketopiperazine and formaldehyde in a neutral solvent.
4. The process of preparing 1-methylol-3,6-diisobutyl-2,5-diketopiperazine, which comprises reacting leucine diketopiperazine and formaldehyde in an aqueous alkaline medium and then separating insoluble 1-methylol-3,6-diisobutyl-2,5-diketopiperazine.

5. A compound selected from the group consisting of 1-methylol-3,6-diisobutyl-2,5-diketopiperazine, 5-methylol-3,6-diisobutyl-2,5-diketopiperazine and 1,5-dimethylol-3,6-diisobutyl-2,5-diketopiperazine.

6. 1-methylol-3,6-diisobutyl-2,5-diketopiperazine.

7. 1,5-dimethylol-3,6-diisobutyl-2,5-diketopiperazine.

8. 5-methylol-3,6-diisobutyl-2,5-diketopiperazine.

9. An organic acyl ester of a hydroxyl containing compound selected from the group consisting of 1-methylol-3,6-diisobutyl-2,5-diketopiperazine, 5-methylol-3,6-diisobutyl-2,5-diketopiperazine and 1,5-dimethylol-3,6-diisobutyl-2,5-diketopiperazine, wherein said organic acyl group is selected from the group consisting of acetyl, dinitrobenzoyl and tosyl.

References Cited in the file of this patent

UNITED STATES PATENTS 2,586,168   Kaszuba _____ Feb. 19, 1952

OTHER REFERENCES

Helv. Chim. Acta, volume 5, page 683 (1922).